United States Patent [19]

Schmuck

[11] Patent Number: 5,511,947
[45] Date of Patent: Apr. 30, 1996

[54] CYCLIC PITCH CONTROL HAVING TORSION SPRING SYSTEM

[75] Inventor: Terry L. Schmuck, Lake Bluff, Ill.

[73] Assignee: The Boeing Company, Seattle, Wash.

[21] Appl. No.: 390,837

[22] Filed: Feb. 17, 1995

[51] Int. Cl.$^6$ ................................................. B64C 27/54
[52] U.S. Cl. .......................................... 416/131; 416/141
[58] Field of Search ................................. 416/131, 133, 416/141

[56] References Cited

U.S. PATENT DOCUMENTS

| | | | |
|---|---|---|---|
| 3,941,503 | 3/1976 | Bruel | 416/141 |
| 4,178,130 | 12/1979 | Ferris et al. | 416/141 |
| 4,349,316 | 9/1982 | Hughes et al. | 416/141 |
| 4,430,045 | 2/1984 | Cresap | 416/141 |

FOREIGN PATENT DOCUMENTS

| | | | |
|---|---|---|---|
| 0466503 | 7/1950 | Canada | 416/141 |
| 2926935 | 1/1981 | Germany | 416/141 |

*Primary Examiner*—Edward K. Look
*Assistant Examiner*—Mark Sgantzos
*Attorney, Agent, or Firm*—Thomas W. Hennen

[57] ABSTRACT

A pitch control system for a vertically launchable and recoverable winged aircraft includes a collective and cyclic pitch control system, a drive yoke and a rotor hub. The collective and cyclic pitch control system is operably connected to two proprotor blades to cyclically control the pitch of each proprotor blade, so that the aircraft is capable of controlled helicopter mode flight when the aircraft body is pointed in a generally upward direction. Proprotor blade flapping caused by applying cyclic pitch control results in teetering of the rotor hub with respect to the drive yoke. Torsion bar springs are used with suitable mechanical linkages to resist this teetering motion and generate the hub moment which is transmitted to the airframe and used to maneuver the aircraft.

3 Claims, 4 Drawing Sheets

CYCLIC PITCH CONTROL HAVING TORSION SPRING SYSTEM

BACKGROUND OF THE INVENTION

1. Field of Invention

This invention pertains generally to aircraft propulsion systems, and more particularly to an aircraft cyclic pitch control system including proprotor hub and drive yoke mechanism. With greatest particularity, the invention pertains to a cyclic pitch control mechanism which utilizes a torsion spring and associated linkages to transmit cyclic rotor control moments resulting from proprotor blade flapping to the airframe.

2. Description of the Related Art

Various types of aerial vehicles have been developed which are capable of vertical takeoff and landing, yet which also fly like a fixed wing aircraft. Some of these aerial vehicles are not intended to carry human operators or passengers. Such an aerial vehicle is termed an "Unmanned Aerial Vehicle" or UAV. The propelling blades are termed proprotor blades since they act both as rotor blades in helicopter flight mode and as propellers in fixed wing aircraft flight mode.

The present invention pertains to structure used in helicopter mode flight but that is also critical lo performing the transition between helicopter and airplane flight modes. The term "proprotor blades" will be used to describe the propelling blades since they serve dual functions in different flight modes. The present invention is for use in such an aerial vehicle as described in U.S. patent application Ser. No. 08/206,558 which was filed Mar. 4, 1994, for VERTICALLY LAUNCHABLE AND RECOVERABLE WINGED AIRCRAFT by Nicholas Albion.

The UAV typically has a collective and cyclic pitch control system which allows the UAV to not only take off and land like a helicopter, but also to maneuver sideways in flight like a helicopter, and to adjust pitch while operating in the fixed wing aircraft flight mode. For flight in the fixed wing aircraft mode, the entire aircraft fuselage rotates from a vertical orientation to a horizontal orientation.

Cyclic pitch control refers to helicopter mode flight and means that proprotor blades may be positioned at different pitch angles during a portion of each proprotor blade revolution. Changing pitch during a single revolution usually means also changing angle of attack and consequently changing the lifting force produced by the proprotor blade during each revolution. This changing lifting force is generally referred to as proprotor blade flapping force. Such changing lift or flapping force gives rise to changing forces at the rotor hub which are used to control the motion and attitude of the entire aircraft.

For flight in the helicopter mode, the aircraft cyclic pitch control mechanism must incorporate means to transmit forces and moments from the proprotor hub flapping to the airframe in order to control aircraft flight. Conventional means for absorbing proprotor blade flapping forces use packs of coil springs or elastomeric bearings. These approaches typically are very heavy, bulky, expensive, and difficult to inspect. Coil springs have a nonlinear spring rate which adds to the difficulty. These mechanisms add to the aircraft's weight and complexity, thereby increasing thrust, power and maintenance requirements, and aircraft risk.

It is desirable to have an unmanned VTOL aircraft, capable of both normal fixed wing aircraft and helicopter flight, which is simple in design, mechanically reliable, relatively light, and efficiently maneuverable in both fixed wing aircraft and helicopter mode flight. It is further desirable to eliminate complicated mechanisms in the aircraft such as those necessary for absorbing proprotor blade flapping forces, which increase aircraft weight, power and maintenance requirements, and risk.

SUMMARY OF THE INVENTION

The present invention solves the aforementioned problems and other problems of the prior art, and provides a simplified rotor hub mechanism for absorbing proprotor blade flapping forces. The aircraft includes an airframe, at least one nacelle gearbox connected to the airframe and receiving power from an engine through a rotatable shaft and having an output shaft, and a cyclic pitch control system. The cyclic pitch control system is operably connected to each proprotor blade to control the pitch of each proprotor blade. The aircraft thereby is capable of a helicopter mode of flight with fine directional control when the aircraft center body or wing leading edge is pointing in a generally upward direction.

The circular area swept by the rotating proprotor blades is termed the disc. The aircraft carries out horizontal direction helicopter mode flight by tipping the disc downwardly toward the direction of intended helicopter mode flight with the cyclic pitch control system. The horizontal thrust component from the action of the proprotor blades then drives the aircraft in the direction of intended flight. Flapping forces applied to the rotor hub by a proprotor blade causing the hub to teeter through the teetering hinge are transmitted by a link mechanism and are reacted in a torsion spring arrangement which applies a restoring force to tile rotor hub which is reacted through the rotor shaft to the airframe.

One object of the present invention is to eliminate heavy mechanisms for absorbing proprotor blade flapping forces in a rotor hub. Another object of the present invention is to provide a simple mechanism for absorbing proprotor blade flapping forces in a rotor hub which is easily inspected and maintained without requiring entire rotor hub disassembly. Yet another object of the invention is to provide a relatively low cost mechanism for absorbing proprotor blade flapping forces in a rotor hub and applying those forces to the aircraft structure.

BRIEF DESCRIPTION OF THE DRAWING

These and other objects, features, and advantages of the invention will be apparent from the following detailed description when taken in conjunction with the accompanying drawing figures, wherein.

DESCRIPTION OF THE PREFERRED EMBODIMENT

Figure 1:
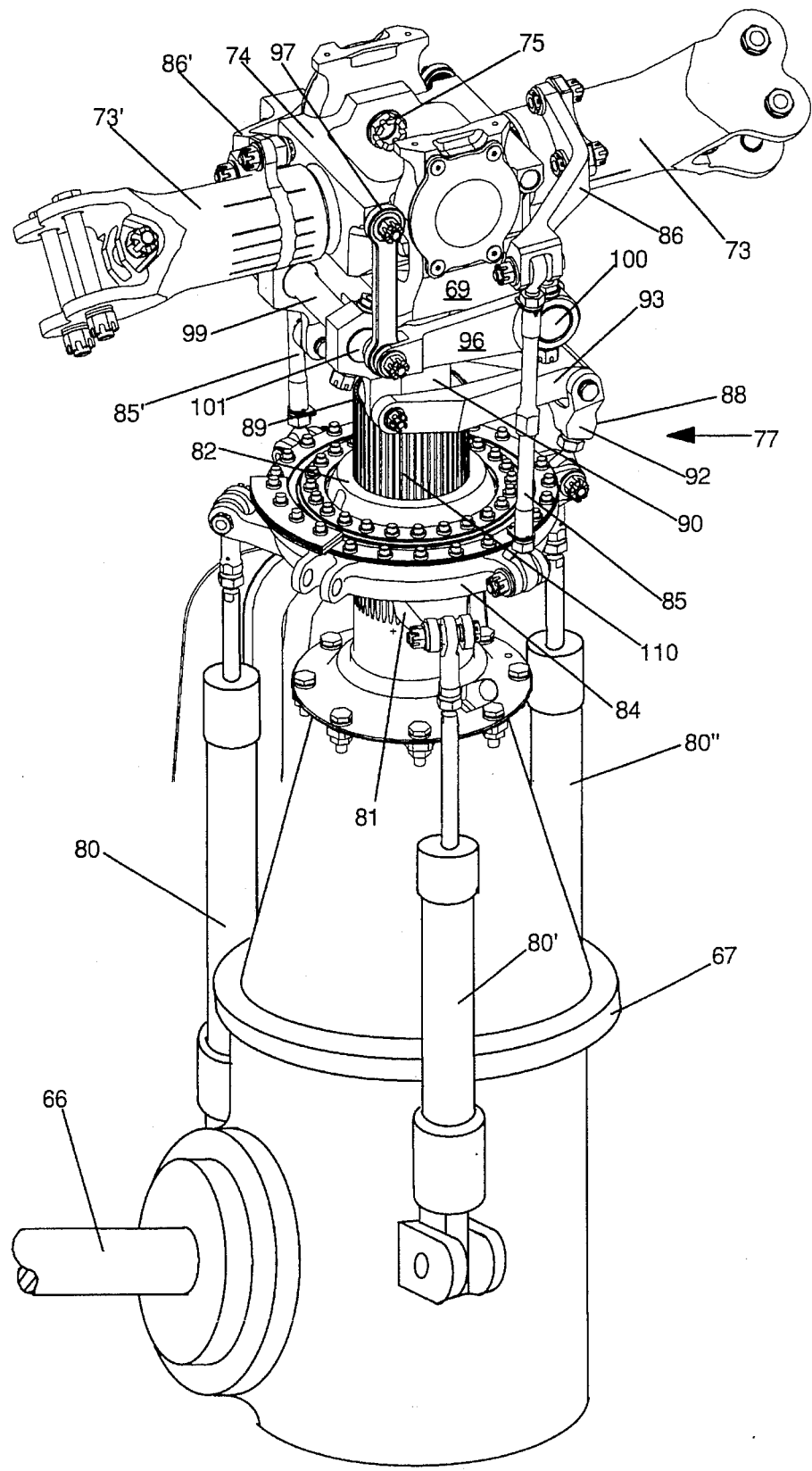
FIG. 1 is a perspective view of the preferred cyclic pitch control system illustrating the present invention.

Referring now to the drawing, wherein like reference characters designate like parts and elements throughout the several figures, there is shown in FIG. 1 nacelle gearbox 67, proprotor shaft 90, and a pitch control system including pitch housings 73 and 73'. Proprotor blades (not shown) fasten to pitch housings 73 and 73' to form a two bladed proprotor. Pitch housings 73 and 73' are pivotably connected to barrel portions 72 of rotor hub 74 on each side through a bearing and centrifugal retaining mechanism (not shown) as is conventionally known. Rotor hub 74 in turn is pivotably connected to drive yoke 69 through teetering hinge 75 which defines teetering axis 76 for accommodating proprotor blade flapping. Drive yoke 69 is connected by splines (not shown) to proprotor shaft 90, which extends out of nacelle gearbox 67 and delivers power to the proprotor.

The proprotor blades rotate through a substantially circular planar section (actually very slightly upwardly conical) known as the disc. Pitch control system 77 controls proprotor blade pitch around the pitch axis defined by the pitch housings 73 and 73' and hub barrel portions 72 on each side. With collective pitch control, the pitch of each proprotor blade is changed simultaneously. When proprotor blade pitch is changed collectively, the pitch change is the same, independent of blade position within the disc. Since pitch control system 77 is capable of collective pitch control, it is a "collective pitch control system."

However, pitch control system 77 also is a "cyclic pitch control system." With cyclic pitch control, proprotor blade pitch is dependent on instantaneous proprotor blade position around the disc. Cyclic pitch control varies proprotor blade pitch around the disc so that proprotor blade pitch is reduced on one side of the disc and increased on the other side of the disc. The aircraft flies toward the side on which the disc tilts downwardly. The disc tilts in the direction substantially 90° of azimuth later (determined by rotational direction) than the side of the disc where the pitch is reduced. This is due to a dynamic condition called "precession" which is common to all helicopter rotor systems.

To fly in a desired direction, the operator must reduce proprotor blade pitch on the side of the disc where the proprotor blades advance toward the desired direction of flight, and increase proprotor blade pitch on the side of the disc where the blades retreat from the desired direction of flight. Thus as used herein, the "advancing side" is the side of the disc where blades advance toward the direction of flight, and the "retreating side" is the side of the disc where blades retreat from the direction of flight. Therefore, if a helicopter with counterclockwise rotating proprotor blades (viewed from above) is to fly in its forward direction, then proprotor blade pitch on the disc right side must be decreased, and blade pitch on the left side increased. The disc then tilts forwardly, creating a forward horizontal thrust component. Thus, each time a proprotor blade goes through one rotation, it also goes through a cycle whereby its pitch is at a minimum in tile middle of the advancing side of the disc, and at a maximum near the middle of the retreating side of the disc.

While tile proprotor blades go through these cyclical pitch changes, they also go through cyclic flapping changes which cause the disc to tilt. Again to produce forward flight, about 90° after the proprotor blade completes traveling on the advancing side of the disc, the proprotor blade is pitched to a greater angle of attack to produce greater lift and exerts a greater upward moment on hub 74. As the proprotor blade flaps (deflects upwardly and applies greater upward moment to hub 74), hub 74 pivots upwardly on that proprotor blade side.

As that side of hub 74 pivots upwardly, hub 74 rotates at teetering hinge 75 about teetering or flapping axis 76 with respect to drive yoke 69. Teetering also permits the disc to tilt relative to proprotor shaft 90. The tilting of the rotor disk provides aircraft control by tilting the proprotor thrust vector to provide a forward component and moment and by twisting the torsion springs to apply a moment to tip the aircraft in the direction of flight. Without the torsion spring system, the hub would have to flap to much higher angles to generate the necessary maneuvering forces and moments and transition between helicopter and airplane flight would be very difficult or impossible.

About 90° after the retreating side, the proprotor blade pitch and angle of attack is decreased and the proprotor blade produces less lift and flaps downwardly. As a result of different lift forces on different sides of the disc, the disc tilts toward the desired direction of flight, creating a horizontal thrust component driving the aircraft in the desired direction. Furthermore, such cyclic pitch control may be used to pitch, roll, or tip the aircraft front end toward the desired direction of flight, thereby tilting the entire airframe and creating an even greater forward, rearward, or sideward component of thrust, as the case may be. The horizontal thrust component ill the desired flight direction may be used to fly the aircraft sidewardly, forwardly, or rearwardly in the helicopter mode, as desired.

As shown in FIG. 1. pitch control system 77 generally includes three actuators 80, 80' and 80", a stationary swashplate 81, a uniball 82, a rotating swashplate 84, two pitch links 85 and 85', two pitch arms 86 and 86', and a scissors 88. Alternatively, the actuators 80, 80' and 80" could be electromechanical servos, or some other type of servo. The piston actuators 80, 80' and 80" are spaced about 120° apart, and at their lower ends are pivotably connected to lugs on nacelle gearbox 67. At their upper ends the three actuators 80, 80' and 80" are connected pivotably to lugs on stationary swashplate 81. Non-rotating stationary swashplate 81 is connected to non-rotating static mast 89 through uniball 82. Splines 110 between uniball 82 and static mast 89 allow upward and downward movement of uniball 82 and stationary swashplate 81 over static mast 89, but substantially no rotational movement about static mast 89.

Two pins 114, positioned about 180° apart on stationary swashplate 81, extend inwardly into vertical slots 115 in uniball 82. The pin and slot structure allows the stationary swashplate 81 plane to pivot in any direction with respect to the central axis of uniball 82 (and of rotating proprotor shaft 90), so that the plane of stationary swashplate 81 is not constrained to a 90° angle to proprotor shaft 90. Rotating swashplate 84 is connected rotatably to stationary swashplate 81 through a bearing race (not shown). Two pitch links 85 and 85', arranged about 180° apart at their lower ends around proprotor shaft 90 and arranged substantially 90° with respect to the position of their respective proprotor blades, are pivotably connected to lugs on rotating swashplate 84. At their upper ends, pitch links 85 and 85' are pivotably connected to pitch arms 86.

Scissors 88 includes lower link 92 which at its lower end is pivotably connected to rotating swashplate 84. At its upper end, lower link 92 is pivotably connected to for 93, which is also part of scissors 88. Fork 93 is roughly Y-shaped, the two arms of the Y going around opposite sides of proprotor shaft 90 to each pivotably connect to a descending lug on drive yoke 69.

As proprotor shaft 90 rotates, it rotates drive yoke 69, hub 74, the proprotor blades, pitch links 85 and 85', scissors 88 and rotating swashplate 84. The two piece construction of scissors 88 transmits torque which rotates swashplate 84, independent of the pivot angle which swashplates 84 and 81 form with respect to the central axis of proprotor shaft 90. Scissors 88 relieves pitch links 85 and 85' from having to transmit torque to rotating swashplate 84. The bearing race (not shown) between rotating swashplate 84 and stationary swashplate 81 allows the former to rotate while the latter does not.

Actuators 80, 80' and 80" each contain pistons (not shown). The degree of such actuator piston actuation determines the position of the swashplates 81 and 84 at any point in proprotor blade revolution around the disc. Collective pitch control is accomplished by moving all three actuator pistons equal distances. This moves both swashplates 81 and 84 and pitch links 85 and 85' the same distance. Pitch links 85 and 85', acting through pitch arms 84, pivot both pitch housings 73 and 73' approximately the same amount, so that the proprotor blades also pivot approximately the same amount. Thus with collective pitch control, the pitch of all proprotor blades are simultaneously changed the same amount. The collective pitch control thereby varies the amount of thrust produced by tile proprotor, and can also be used to compensate for inflow through the disc during flight.

Whenever tile proprotor blades flap, rotor hub 74, shown in FIG. 1, teeters on teetering hinge 75 about teetering axis 76. This hub displacement caused by proprotor blade flapping is reacted through the torsion spring system 95 to the rotor shaft and airframe applying a moment to the aircraft.

Figure 2:
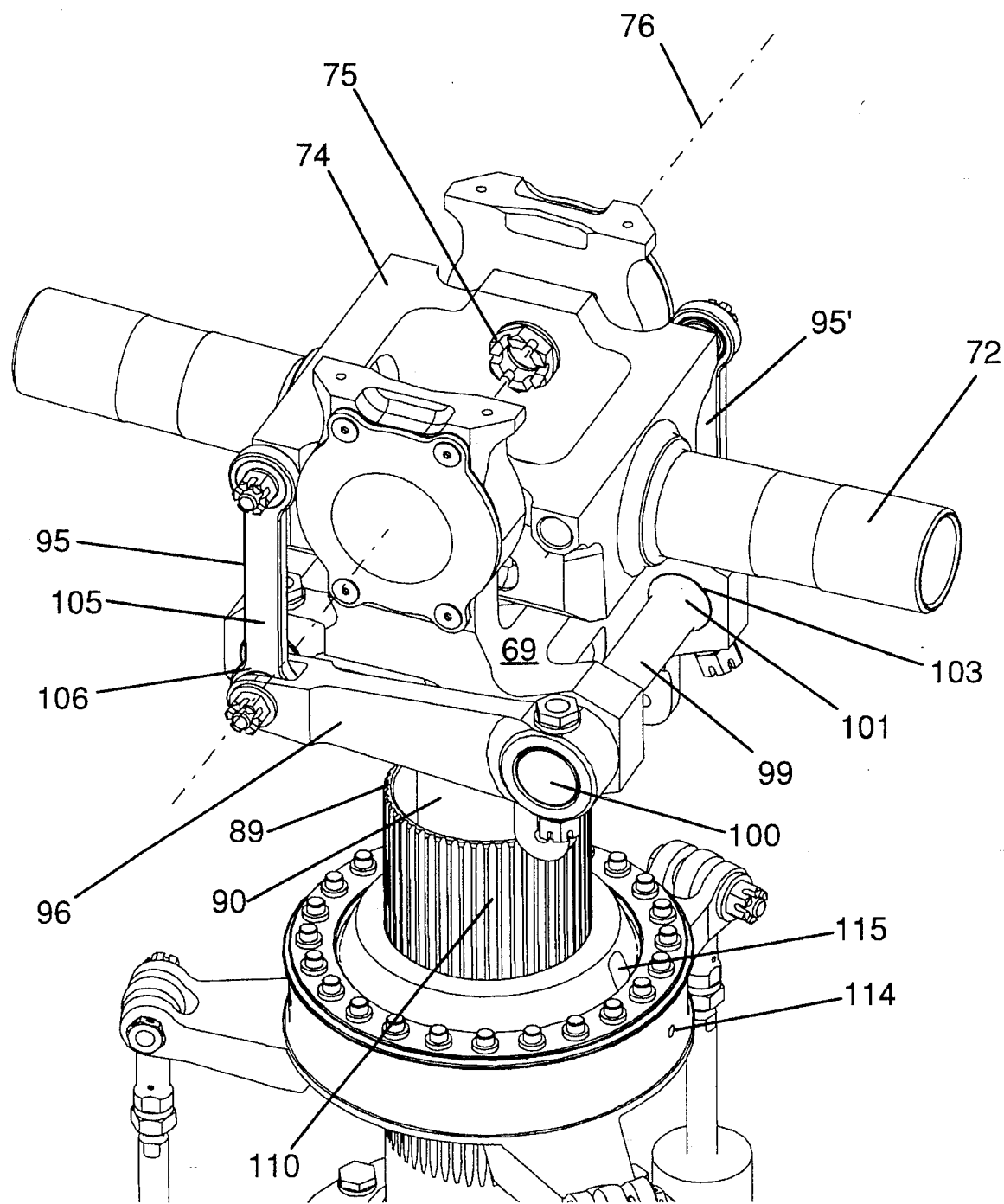
FIG. 2 is a perspective view of tile preferred torsion spring system of the present invention installed on the rotor hub and drive yoke of the preferred cyclic pitch control system.
Figure 3:
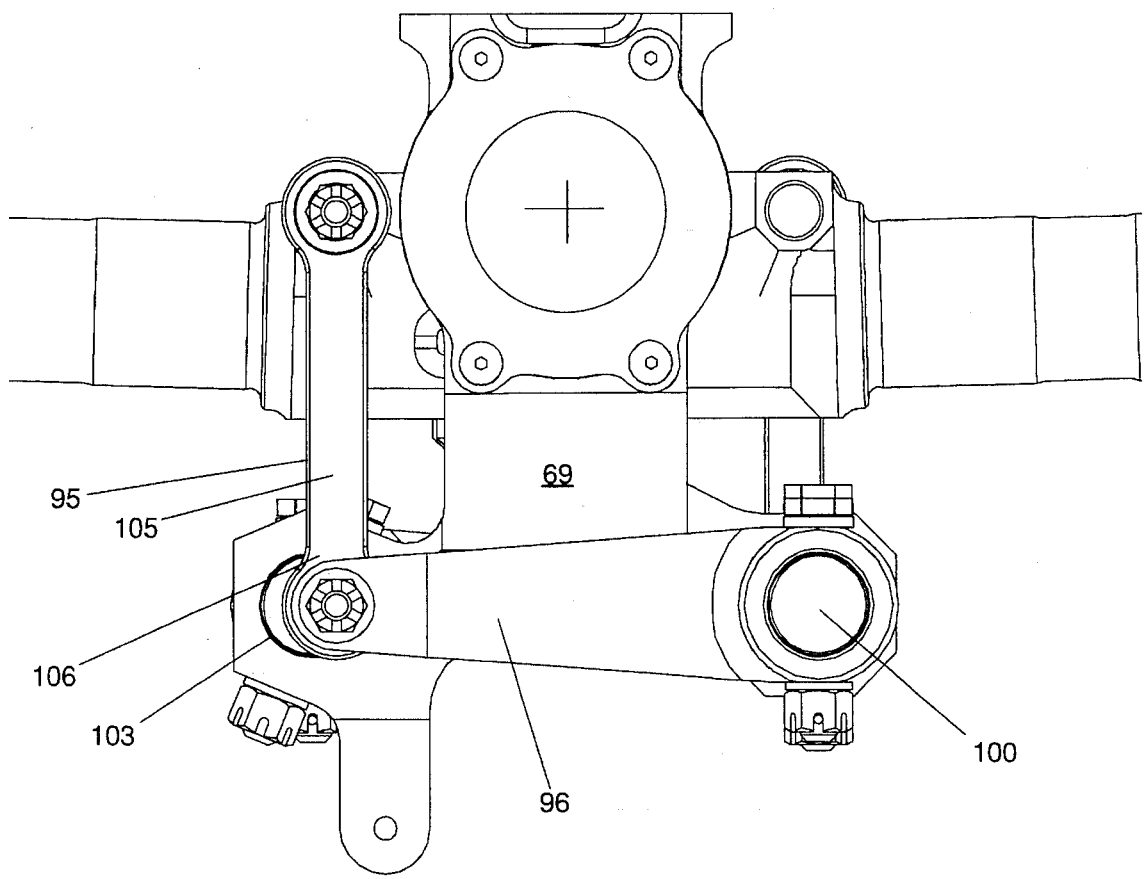
FIG. 3 is a side view of the drive yoke illustrating the preferred torsion spring system of the present invention.
Figure 4:
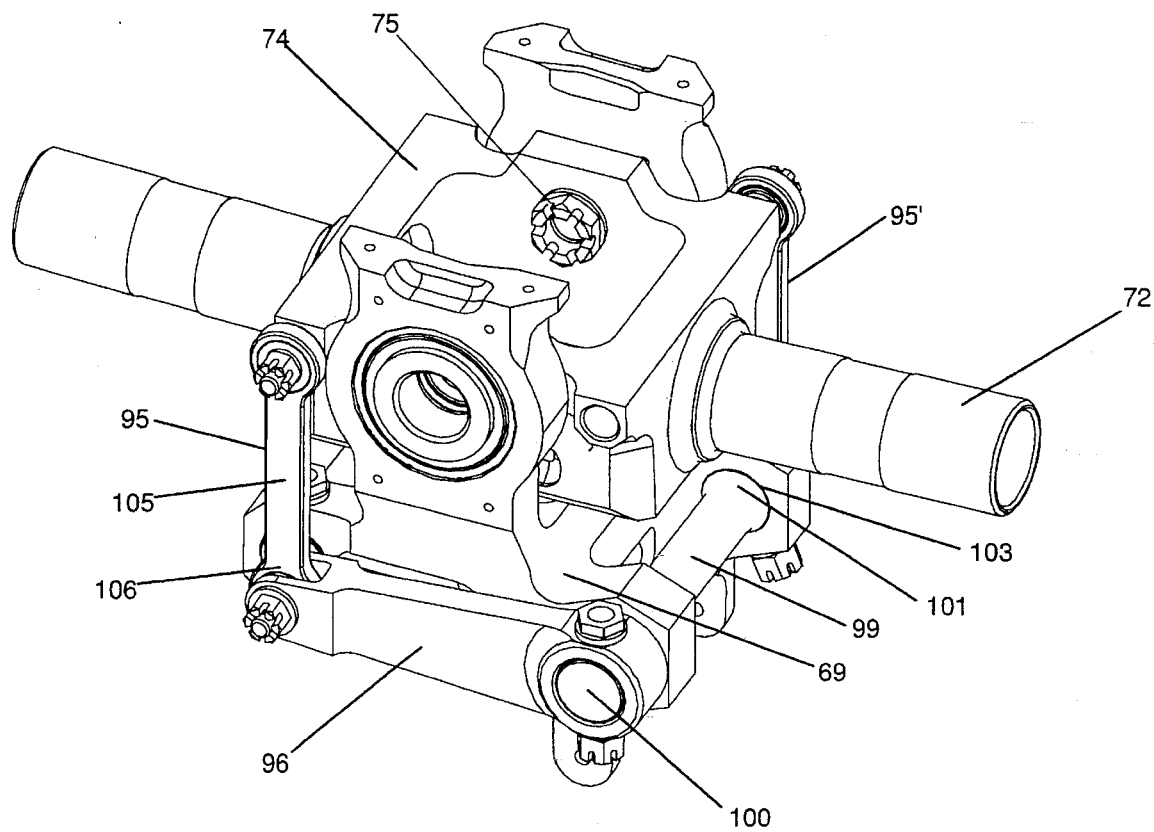
FIG. 4 is a perspective view of the torsion spring system of the present invention installed on the rotor hub and drive yoke of the preferred cyclic pitch control system.

The pitch control system includes two torsion spring systems 95 and 95' which are substantially alike in structure and operation and which each correspond to a different one of the proprotor blades, respectively. As shown most clearly in FIGS. 2, and 4, torsion spring system 95 includes force member 105, lever arm 96 and torsion bar 99. Primed reference characters refer to the corresponding components of torsion spring system 95'. Force member 105 at its upper end is pivotably connected to hub 74 at connection joint 97 which is positioned spaced laterally from teetering hinge axis 76. At force member lower end 106, force member 105 is pivotably connected to lever ann 96. Lever arm 96 is rigidly connected to torsion bar 99 at torsion bar end 100 in a manner enabling lever arm 96 to rotate in a plane perpendicular to the axis of torsion bar 99 and to transmit torque to torsion bar 99. Torsion bar end 101 is connected to drive yoke 69 at drive yoke receiving hole 103 in a manner enabling drive yoke 69 to resist torque applied by torsion bar 99. The axis of torsion bar 99 is substantially parallel with the teetering axis 76 of teetering hinge 75. Torsion bar 99 is manufactured from conventional materials as is well known in the art.

Cyclic pitch control is accomplished by moving the pistons in actuators 80, 80' and 80" in a coordinated way so that the actuator upper ends (and swashplates 81 and 84) are displaced to define an intended plane which is not perpendicular to the central axis of proprotor shaft 90, and the two pitch links 85 and 85' thereby may differ in their relative positions along the central axis of proprotor shaft 90. Since pitch links 85 and 85' may differ in axial position at any point in time, the two pitch arms 86 and 86' may also differ in rotational position, so that the two pitch housings 73 and 73' and the attached proprotor blades can be pivoted different amounts respectively at any one time. The range of pitch differences are limited however by the orientation of rotating swashplate 84.

Since swashplate 84 rotates with respect to swashplate 81 and both swashplates 81 and 84 are tilted relative to proprotor shaft 90, pitch links 85 and 85' together with pitch arms 86 and 86', pitch housings 73 and 73', and attached proprotor blades go through an entire cycle varying blade pitch for each rotation of rotating swashplate 84 and proprotor. The swashplates 81 and 84 are tilted downwardly in the direction of blade advance, and upwardly in the direction of blade retreat.

Cyclic pitch control can be used to change the angle of proprotor blade attack on two sides of the disc to make up for the asymmetry of air velocity to keep the disc trimmed in forward helicopter mode flight. Further, it can be used to initiate a maneuver using proprotor blade flapping about the teetering hinge 75 by unbalancing lift on opposite sides of the proprotor. Additionally, in appropriate aircraft, cyclic pitch control can be used during helicopter mode flight, during transitions between helicopter mode flight and fixed wing aircraft mode flight, and during fixed wing aircraft mode flight, to control the hub force loads and moments developed by proprotor blade flapping.

As mentioned earlier, proprotor blade flapping causes the hub 74 to teeter. If, for example, the left side of hub 74 shown in FIG. 2 teeters with respect to drive yoke 69 downwardly, force member 105 is pushed downwardly. As shown in FIGS. and 2, this causes lever ann 96 to rotate about the central axis of torsion bar 99, twisting torsion bar 99 counterclockwise. Torsion bar 99 acts as a spring resisting the twisting motion, biasing hub 74 back up to its normal horizontal position with respect to drive yoke 69. If the left side of hub 74 teeters up, torsion bar 99 is twisted clockwise. Torsion bar 99 then applies a counteracting force to lever ann 96 and force member 105 to return hub 74 to its normal position. Force member 105 provides a way of connecting lever arm 96 to hub 74 so that lever ann 96 may be located sufficiently low for convenient connection of lever ann 96 to torsion bar 99, and for convenient fixed connection of torsion bar 99 at torsion bar end 101 to drive yoke 69. Force member 105 thereby transmits the force and motion of hub 74 to lever arm 96, and in turn transmits the counteracting force from torsion bar 99 and lever arm 96 to hub 74. Alternatively, hub 74, drive yoke 69, torsion bar 99, and lever arm 96 could be configured so that lever arm 96 is directly connected to hub 74.

Various pitch control systems are disclosed in *Helicopter Theory*, Johnson, W., Princeton University Press, 1980; *Helicopter Performance, Stability and Control*, Prouty, R.W., PWS, 1986; and *Aerodynamics of the Helicopter*, Gessow, A., and Myers, Jr., G. C., New York, Macmillan, 1952; the entire disclosures of these references being hereby incorporated herein by this reference.

It is to be understood that the present invention is not limited to the particular arrangement and embodiments of parts or processes disclosed and illustrated herein, nor to the materials specified. It is intended that all matter contained in the foregoing description or shown in the accompanying drawing shall be interpreted as illustrative and not limiting. Other improvements, modifications and embodiments will become apparent to one of ordinary skill in the art upon review of this disclosure. Such improvements, modifications and embodiments are considered to be within the scope of this invention. Therefore, the present invention embraces all such modified forms thereof as come within the scope of the following claims.

I claim:

1. An aircraft cyclic pitch control including a rotor hub and drive yoke, the rotor hub being pivotably connected through a teetering hinge to said drive yoke for limited relative rotation about a teetering axis directed substantially perpendicular to the axis of said drive yoke, and having a torsion spring system, for generating the hub moment which is used to control aircraft flight by biasing the rotor hub, said torsion spring system further comprising:

- a lever arm having first and second ends, pivotably connected on said first end to said rotor hub at a point laterally spaced from said teetering axis; and
- a torsion bar having fixed and rotating ends, rigidly connected on said rotating end to the second end of said lever arm and rigidly connected on the fixed end to said drive yoke, said torsion bar having a torsion bar axis aligned substantially parallel with said teetering axis;

wherein the rotor hub pivoting with respect to the drive yoke causes the lever arm to rotate about the torsion bar axis, twisting the torsion bar and causing the torsion bar to apply a resisting force to the rotor hub through the lever arm, biasing the rotor hub back toward its normal position.

2. The aircraft cyclic pitch control of claim 1, further including a force member having first and second ends, through which said lever arm is connected to the rotor hub.

3. The aircraft cyclic pitch control of claim 2, wherein the first end of said force member is pivotably connected to said rotor hub and said lever arm first end is pivotably connected to the second end of said force member.

* * * * *